Fig. 1

Aug. 18, 1964   J. R. THOMAS   3,144,923
VARIABLE POWER TRANSMITTING HYDRAULIC APPARATUS
Filed Sept. 1, 1960   7 Sheets-Sheet 2

INVENTOR
John R. Thomas
BY Frank J. Schraeder Jr.
ATTORNEY

INVENTOR
John R. Thomas
BY Frank J. Schraeder Jr.
ATTORNEY

Aug. 18, 1964  J. R. THOMAS  3,144,923
VARIABLE POWER TRANSMITTING HYDRAULIC APPARATUS
Filed Sept. 1, 1960  7 Sheets-Sheet 4

INVENTOR
John R. Thomas
BY Frank J. Shraeder Jr.
ATTORNEY

United States Patent Office 3,144,923
Patented Aug. 18, 1964

3,144,923
VARIABLE POWER TRANSMITTING
HYDRAULIC APPARATUS
John R. Thomas, Wichita, Kans., assignor to The Thomas Company, Inc., Wichita, Kans., a corporation of Kansas
Filed Sept. 1, 1960, Ser. No. 53,471
9 Claims. (Cl. 192—61)

This invention relates generally to variable power transmitting hydraulic apparatus adapted to be interposed between driving means and a driven member and wherein two fluids of different resistant value, such as for example air and oil, are employed independently as well as in mixtures of relatively varied proportions, and wherein the control of the flow of the independent fluids or of their mixtures is effected through an instrumentality constituting moveable valve means adapted for varying or metering and arresting the flow of the fluids through fluid-circulating power-transmitting pumping means such as, for example, a gear type pump having elements operatively connecting the driving means with the driven member for transmitting selectively variable torque and speed to the driven member.

This invention is of such scope and varied adaptation that the herein disclosed new development may be readily interposed between a prime-mover or a prime-mover-driven means and a power actuated instrumentality or apparatus whereupon the power being transmitted by the prime-mover or the prime-mover-driven means may be absorbed and, if desired, measured.

One of the principal objects of my invention resides in the utilization of gravity for separation of air and oil so essential to the operation of all mechanisms of the aforementioned type, completely obviating any need for fluid separation by centrifugal force which is usually employed in such prior mechanisms. The present use of gravity affords employment of a static oil source exerting a constant force, making available performance characteristics wholly unobtainable when fluid separation is accomplished centrifugally.

Another object of my invention is to entirely eliminate the need for a fluid annulus which is usually employed in hydraulic mechanisms of the hydrostatic type as well as in hydrokinetic fluid couplings and torque converters. Such annulus elimination obviates the need for the annulus container rotatively associated with the aforementioned hydrostatic and hydrokinetic devices of prior art, permitting use of a non-rotatable fluid receptacle having numerous advantages hereinafter described.

Still another object of my invention resides in the utilization of a non-rotatable fluid receptacle which comprises oil priming means for the fluid-circulating power-transmitting means, functioning substantially immediately after neutral operations of said fluid-circulating power-transmitting means wherein air is employed as the fluid circulant, said non-rotatable fluid receptacle containing a static body of oil and oil supply means communicating with said static body of oil and with the fluid-circulating power-transmitting means, including means whereby the alternative use of the oil priming means or the oil supply means is automatically controlled by gravity-actuated valve means operatively associated with floatable valve means.

Another object of my invention is to utilize fluid flow after same has been subjected to pressure and heat during passage through the fluid-circulating power-transmitting pumping means and the fluid control means therefor, said after-pressure fluid utilization involving a flow circuit effecting distribution of the heated fluid whereby such fluid is passed over the major portion of the inner surfaces of the walls of the non-rotatable fluid receptacle during its flow by gravity into the oil reservoir, and whereby maximum heat transfer from the fluid to the fluid receptacle for dissipation therefrom is obtained; the after-pressure flow circuit including exteriorly accessible optional means to readily apply conventional and well known heat exchangers thereto for heat dissipation additional to the maximum heat dissipation obtainable with use only of the aforementioned receptacle, said exteriorly accessable optional means making use of the after-pressure fluid flow activated by the fluid-circulating power-transmitting pumping means to provide partial or complete flow thereof through such applied heat exchangers so as to obviate the need for separate and additional fluid pumping means usually required in connection with heat exchangers.

A further object of the invention resides in the provision of fluid suction and fluid discharge circuit control means associated with fluid-circulating power-transmitting pumping means, which circuit control means embody a novel circuit porting control element automatically actuable to reverse the functional character of the suction and discharge porting of the pumping means, said control means including circuit porting control instrumentalities that retain their normal functional character regardless of the direction of rotation of the pumping means.

The various features of novelty whereby the present invention is characterized will hereinafter be pointed out with particularity in the appended claims; but, for a full understanding of the invention and of its various objects and advantages, reference may be had to the following detailed description taken in connection with the accompanying drawings, wherein:

FIG. 3 is a vertical section, taken on line 3—3 of FIG. 1, showing an end view of the non-rotatable manifold and a side elevation of portions of the control valve assembly, the combined pump oil supply unit, and a portion of the manual valve actuating mechanism. FIG. 3 also shows phantom line outlines of major hydraulic circuits for sections 7—7, 8—8, 9—9 and 10—10;

FIG. 21 is a diagrammatic plan view of a dynamometer installation showing a typical application of my new development adapted to variably absorb power from a driving means, including power measuring facilities and heat transfer apparatus.

FIGS. 1 to 3 inclusive and 7 to 10 inclusive are illustrated with the valve at a position mid-point of its total travel.

In the disclosed example of my invention as illustrated in the drawings, the rectangularly shaped receptacle, generally designated by the numeral 20, includes end walls 20$^a$ and 20$^k$, side walls 20$^b$, and an integral axially centrally located web portion 20$^c$. Cast fins 20$^d$, which are preferably employed to enhance receptacle rigidity and receptacle cooling capacity are, for purposes of brevity, illustrated only in FIGS. 1 and 3. A drain plug 20$^e$ is provided. The receptacle 20 is also provided with suitable mounting feet 20$^f$. The web 20$^c$ is provided with transverse openings 20$^g$, 20$^h$ and 20$^j$ to remove excess weight and to permit flow of fluids therethrough.

A receptacle cover 21 preferably with cast fins 21$^a$ is provided with a vent-type fill plug 21$^b$ including an oil level indicating dip stick 21$^c$. The cover 21 is securely fastened to the receptacle 20 by use of cover bolts 22. As illustrated in FIGS. 1, 2, 3, 4, 16 and 17, the cover 21 includes a "U" shaped channel 21$^d$ on the inner surface of two sides and one end of the cover, the channel 21$^d$ having a bottom surface which slopes downwardly outwardly toward the cover's side and end wall surfaces.

The power input shaft 23 is shown provided with a flanged outer portion 23$^a$ to which a mating flanged extension shaft 23$^b$, having a form appropriate for an intended use, is joined as with bolts 23$^c$. The inwardly extending portion of shaft 23 is rotatably supported by a suitable ball bearing 24 which is mounted within an adapting cartridge 25 installed into a bore of the receptacle end wall 20$^a$. The cartridge 25 is provided with an oil seal 26, a bearing retaining snap ring 27 and is securely fastened to the housing end wall 20$^a$ with bolts 28.

The inwardly extending portion of the power input shaft 23 has a diametrically reduced area upon which is mounted a tubular torque tube 23$^d$ shown keyed to shaft 23 with a key 23$^e$. The torque tube 23$^d$ is rotatably mounted within a roller bearing 23$^f$ through which it extends to terminate in a flange portion 23$^g$. The center bore of the torque tube 23$^d$ has a counter-bore for receiving a retaining washer 23$^h$ providing securely tight assembly of the torque tube 23$^d$ with the input shaft 23 by use of a self-locking type nut 23$^j$ having threaded engagement with the shaft 23. The end bore of the torque tube 23$^d$ is provided with a pilot roller bearing 29.

The power output shaft 30 has an outer flanged portion 30$^a$ to which a mating flanged extension shaft 30$^b$, having a form appropriate for the intended use, is joined as with bolts 30$^c$. The inwardly extending portion of shaft 30 is rotatably supported by a ball bearing 31 which is mounted within an adapting cartridge 32 installed into a bore of the receptacle end wall 20$^k$. The cartridge 32 is provided with an oil seal 33, a bearing retaining snap ring 34 and is securely fastened to the receptacle end wall 20$^k$ with bolts 35.

The power output shaft 30 is axially retained with the ball bearing 31 by the retaining snap ring 36, its innermost end being supported by the pilot roller bearing 29.

Figure 1:
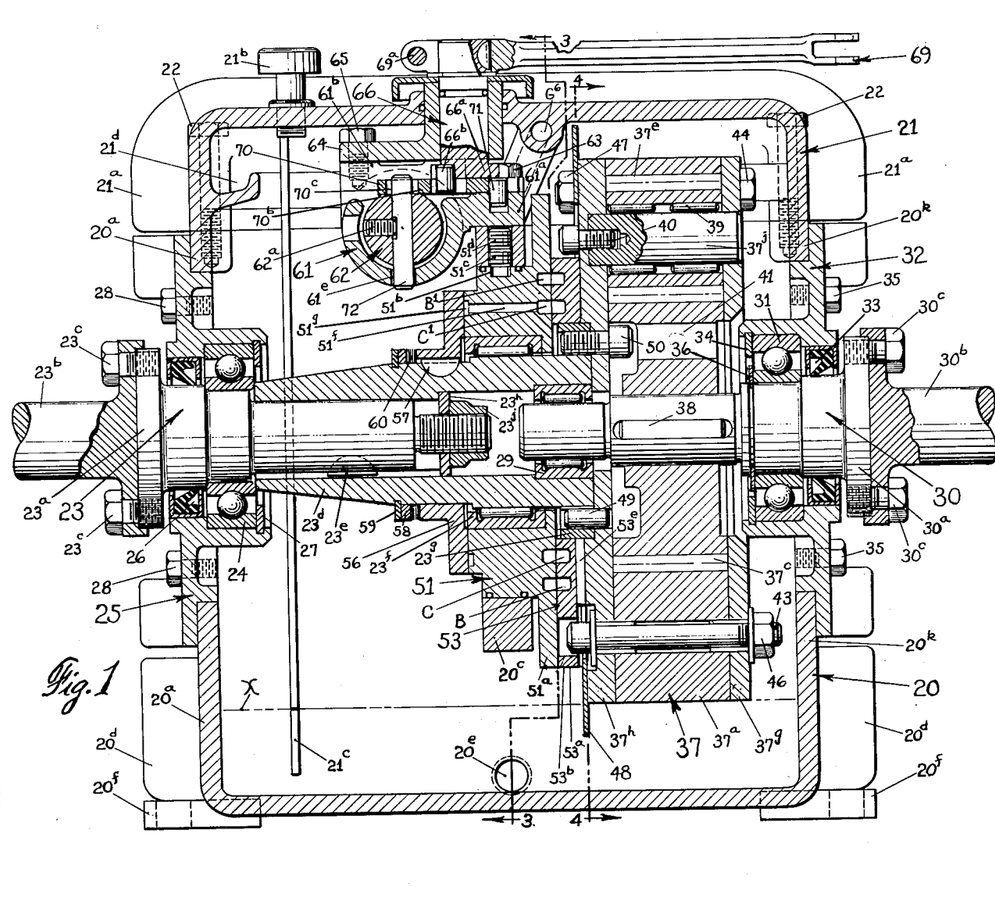
FIG. 1 is a longitudinal section, taken on line A—A of FIG. 3, through variable power-transmitting hydraulic apparatus exemplifying an embodiment of my invention.
Figure 2:
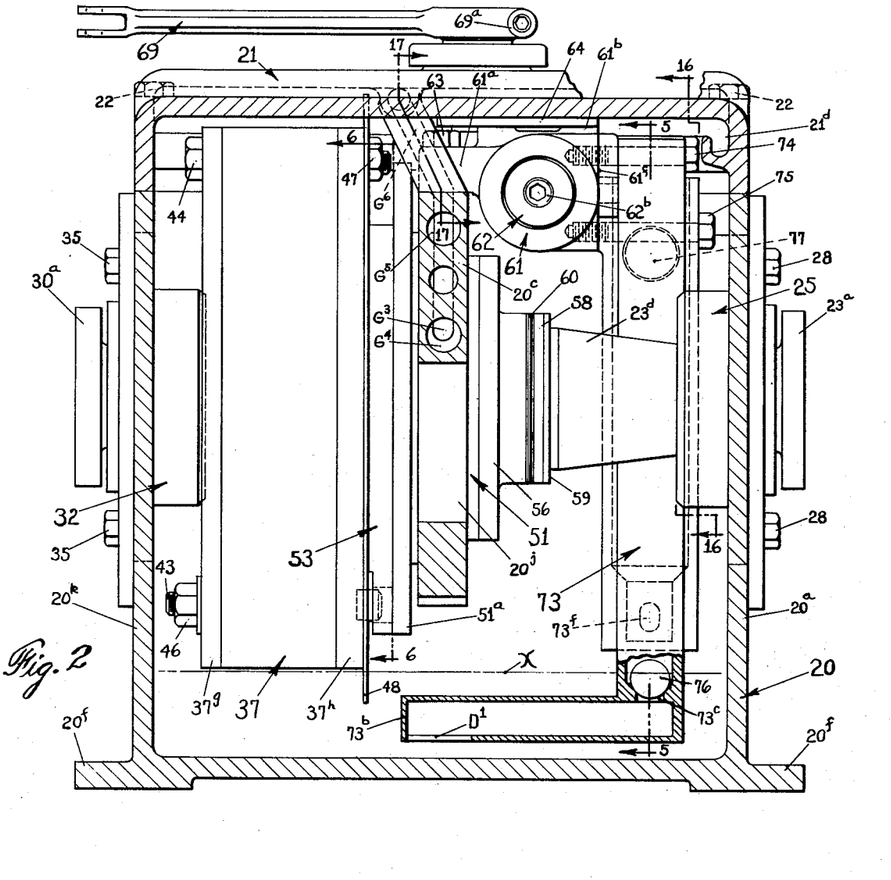
FIG. 2 is a longitudinal section, taken on line 2—2 of FIG. 3, showing a side elevation of the pump assembly, the non-rotatable manifold assembly, the control valve and the combined pump oil supply unit, the extreme lower portion of the pump oil supply unit being in section.
Figure 4:
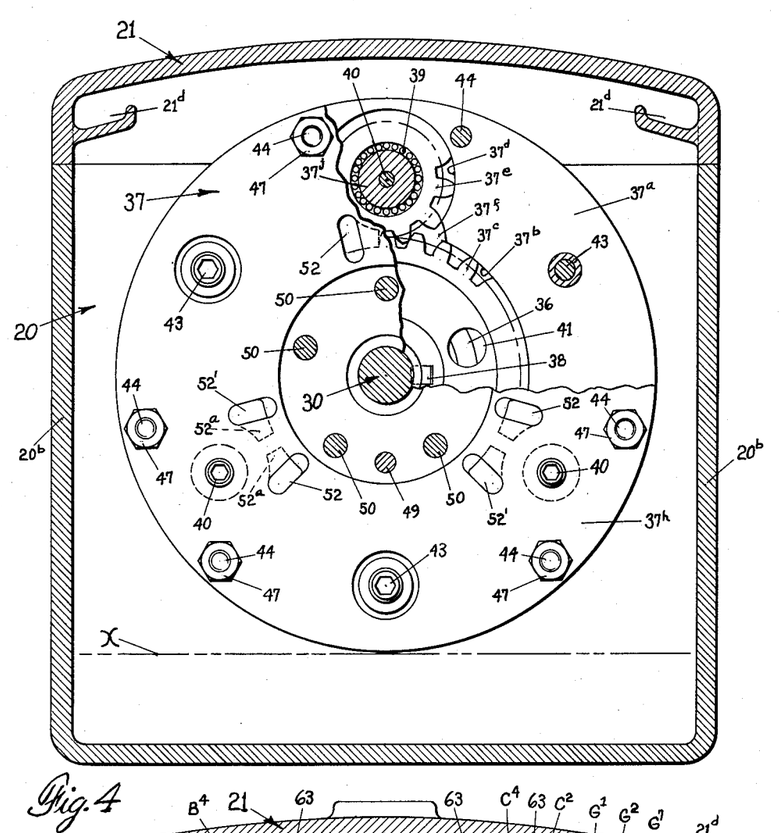
FIG. 4 is a cross-section, taken on line 4—4 of FIG. 1, illustrating an end elevation of the pump manifold showing the suction and discharge ports therein, a portion of the manifold being broken away to bring into view some of the pump body and pump gear elements.

The fluid-circulating power-transmitting instrumentality may comprise any of the well known positive displacement pumps of the spur gear, internal gear, piston or vane types, however, a multiple spur gear type pump is shown, identified generally by the numeral 37. Referring particularly to FIGS. 1, 2 and 4, the pump 37 consists of a circular pump body 37$^a$ having a central bore 37$^b$ containing a sun gear 37$^c$ which is slideably mounted on the power output shaft 30 and operatively connected thereto by the key 38. The central bore 37$^b$ has three arcuate openings in its periphery which communicate with circularly equally spaced cavities 37$^d$, each containing a planet gear 37$^e$ which meshes with the sun gear 37$^c$ to co-act therewith in pumping action when the apparatus is in operation. The central bore 37$^b$ and the cavities 37$^d$ are interconnected by recesses 37$^f$. The sun gear 37$^c$ is provided with a plurality of circularly spaced openings 41 which extend axially through the sun gear to permit assembly of the pump 37 to the torque tube 23$^d$ as hereinafter described.

The pump end plate 37$^g$ and pump manifold plate 37$^h$ form side plates for the pump 37. Each planet gear 37$^e$ is provided with suitable roller bearings 39 and is rotatably mounted on a planet shaft 37$^j$ which is supported by the pump manifold 37$^h$ and by the pump end plate 37$^g$. The planet shaft 37$^j$ is securely fastened to the pump manifold 37$^h$ by a screw 40. Bolts 43 and 44 with nuts 46 and 47 hold the pump body 37$^a$, pump end plate 37$^g$ and pump manifold 37$^h$ securely together.

An oil slinger 48, consisting of a relatively thin circular plate, having an outside diameter to clear the side walls 20$^b$ and the housing cover 21, is secured to the pump 37 by the bolts 44. The pump 37 with its oil slinger 48 is securely fastened to the torque tube flange 23$^g$, by use of the dowel pin 49 and cap screws 50, for positive support by and rotation with the torque tube 23$^d$, the cap screws being of the self-locking type and accessible through the sun gear openings 41.

Figures 3, 21:
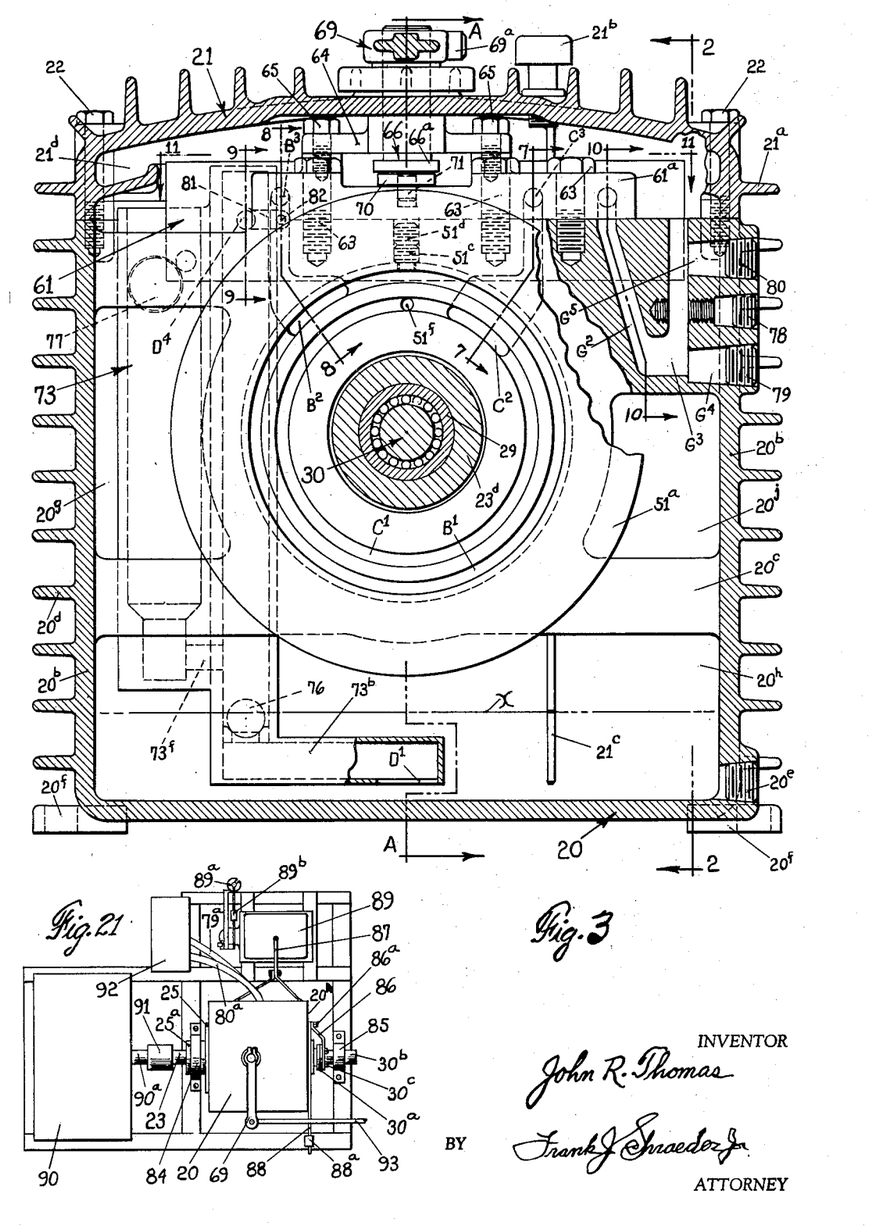

Referring to FIGS. 1, 2 and 3, a non-rotatable manifold 51 having an outwardly extending circularly flanged portion 51$^a$ is shown with its hub-like portion being supported within the receptacle web 20$^c$. The non-rotatable manifold 51 has a slightly axially elongated slot 51$^b$ formed in the uppermost surface of its hub, into which extends the end of a half-dog set screw 51c, preventing rotation of manifold 51 but permitting it to move axially relatively to the web 20c. The half-dog set screw 51c is retained at its properly adjusted position by means of a lock screw 51d.

It will be noted that the torque tube 23d and its roller bearing 23f are radially supported by the central bore of the non-rotatable manifold 51 the hub of which is radially supported by the web 20c.

In the end view of the pump manifold 37h, as seen in FIG. 4, numerals 52 and 52′ designate the pump manifold porting provided for fluids passing into and out of the pump 37. Typical trap relief areas 52a, commonly applied to positive displacement pumps, are shown in dotted lines, being shallowly recessed into the side of the pump manifold 37h which is adjacent to the pump gears.

To describe the commonly well known function character of the manifold ports 52 and 52′ in a manner essential to promote complete understanding of co-acting elements and their functions to be first hereafter described, FIG. 4 may be viewed while consideration is now given to clockwise rotation of the pump 37. Since the sun gear 37c, keyed to the power output shaft 30, will be either stationary or revolving at various speeds the maximum of which is less than that of the rotating speed of the pump 37, the relative rotation of the planet gear 37e will be clockwise around its planet shaft 37j. Rotation of the sun gear 37c relative to the pump body compression wall 37b will be counterclockwise with the result that the pump manifold ports 52 will be operating as fluid suction ports and ports 52′ will be the fluid discharge ports. Now taking the reverse or counter-clockwise rotation of the pump 37 into consideration, the pumping action within the pump will likewise be reversed, ports 52′ becoming the fluid suction ports and ports 52 will be the fluid discharge ports.

An automatically operating port transfer plate 53 is shown in FIGS. 1, 2, 6 and 6A. The central bore of the port transfer plate 53 is sized to freely rotate on the torque tube flange 23g and is radially located thereby. In form, the port transfer plate 53 has an ear-like radially extending portion 53a containing a circularly extended slot 53b which is dimensionally located on the same radius as the bolt heads 43, one of which appears within the slot 53b acting as a driver to cause rotation of the port transfer plate 53 with the pump 37 and its manifold 37h. Other radially extended portions 53c and 53d are placed circularly equi-distant from a point diametrically opposite the ear 53a having such proportions so as to equal the centrifugal weight of the ear 53a and thus maintain proper static balance of the port transfer plate 53.

Figures 5, 7, 8, 9, 10, 16:
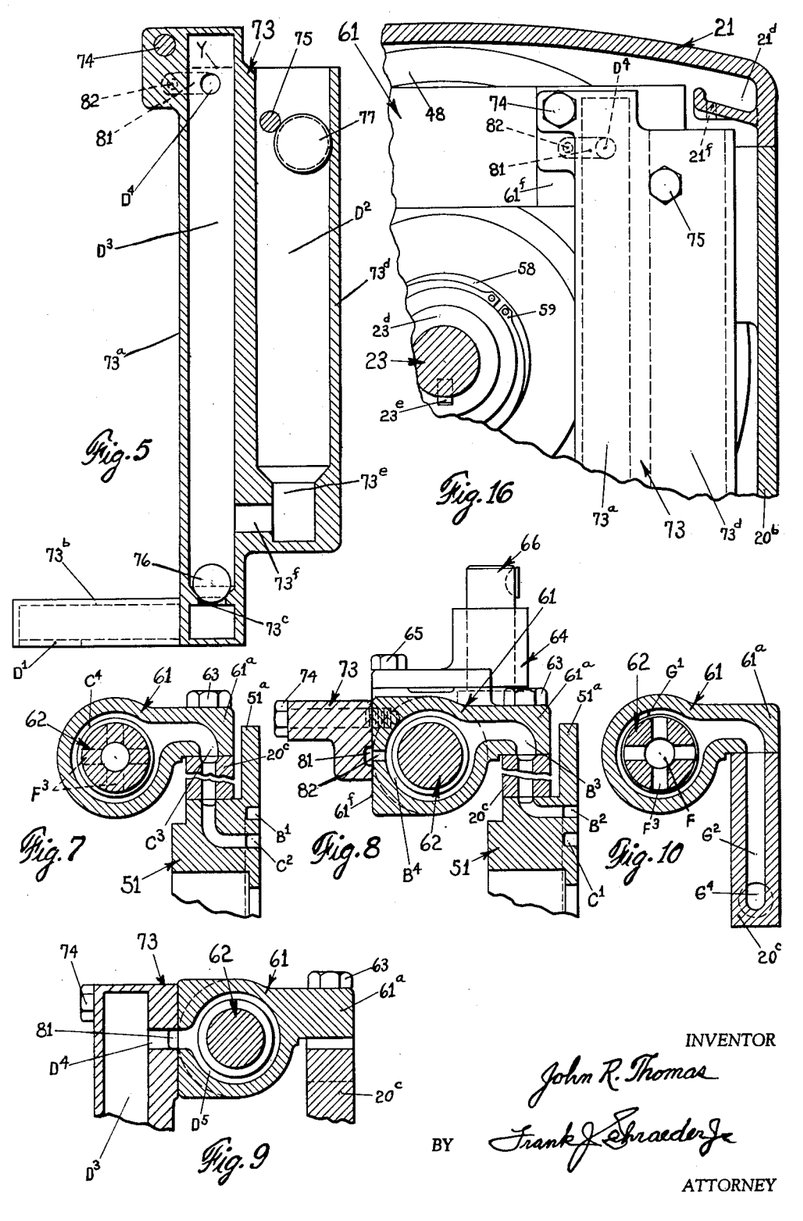
FIG. 5 is a vertical section, taken on line 5—5 of FIG. 2 through the combined pump oil supply unit.
FIG. 7 is a section, taken on line 7—7 of FIG. 3, showing the pump and valve intercommunicating porting extending through the non-rotatable manifold, through its supporting web member, through the valve housing and around the spool valve.
FIG. 8 is a section similar to that of FIG. 7, taken on line 8—8 of FIG. 3, also showing the relative location of the valve housing, the valve, the valve operating shaft and its supporting member and a portion of the pump oil supply unit.
FIG. 9 is a section, taken on line 9—9 of FIG. 3, showing the pump oil supply unit outlet port and the fluid suction control porting in the valve housing.
FIG. 10 is a section, taken on line 10—10 of FIG. 3, showing the after-pressure discharge circuit leading from the valve seat into the web member of the receptacle; the section illustrating the spool valve being taken at the mid-point of its total travel.
FIG. 16 is a fragmentary section, taken on line 16—16 of FIG. 2, showing an upper portion of the combined pump oil supply unit.

Two concentric channels or grooves B and C are formed in one face of the port transfer plate 53, as shown, having a groove depth to approximately one-half the thickness of the plate 53, the face so grooved being the face adjacent the manifold flange 51a. Three circularly equally spaced porting holes 54 pass through the plate 53 through the bottom of the groove B, coinciding with the positions of the pump manifold ports 52′ as viewed in FIG. 6 and coinciding with pump manifold ports 52 as viewed in FIG. 6A. It will be noted that the length of the slot 53b governs the extent of rotation of the port transfer plate 53 relative to the pump manifold 37h so as to provide the operative positions of the port transfer plate 53 as illustrated in FIGS. 5 and 6A respectively.

Figure 6:
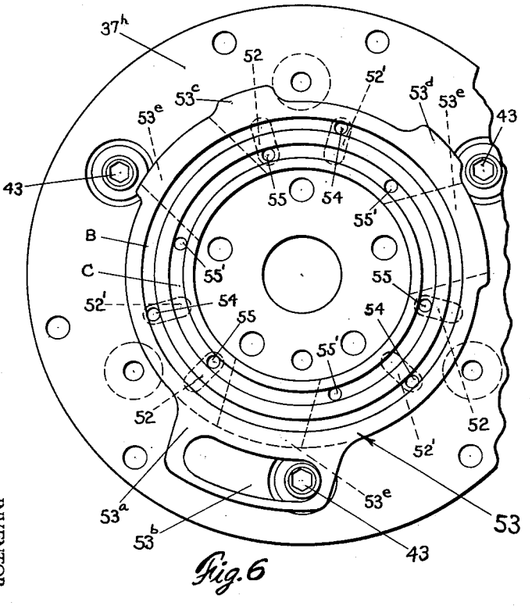
FIG. 6 illustrates an end view of the pump manifold as seen at line 6—6 of FIG. 2, showing the operating position of the automatic port transfer plate located adjacent thereto, during counter-clockwise rotation of the input shaft.
Figures 6A, 18, 19:
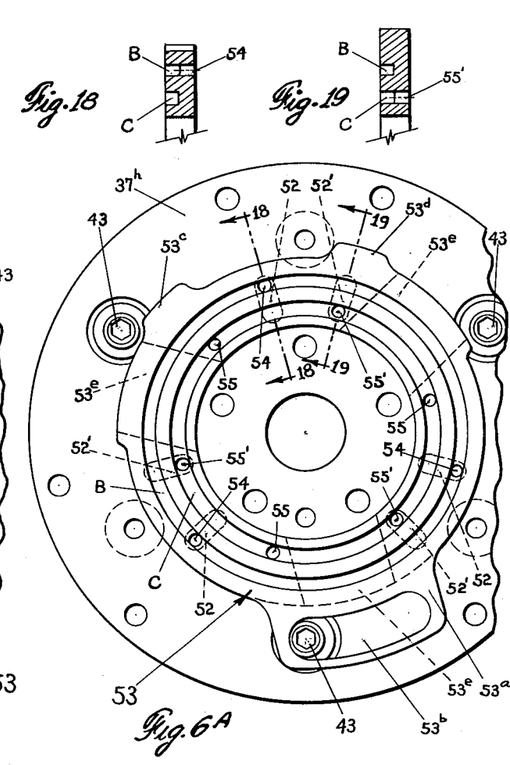
FIG. 6A is an end view of the pump manifold system, as seen at line 6—6 of FIG. 2, showing the operation position of the automatic port transfer plate during clockwise rotation of the input shaft.
FIG. 18 and 19 are sections, taken on lines 18—18 and 19—19, respectively, of FIG. 6$^A$, showing typical fluid channels or grooves in the automatic port transfer plate and some of the porting communicating therewith.

Two groups of three circularly equally spaced porting holes 55 and 55′, respectively, pass through the plate 53 through the bottom of the groove C, the porting hole group 55 coinciding with the positions of the pump manifold ports 52 as viewed in FIG. 6 and the porting hole group 55′ coinciding with the positions of the pump manifold ports 52′ as viewed in FIG. 6A.

As shown in FIGS. 6 and 6A, the port transfer plate 53 has three areas 53e illustrated on the rear face of the plate 53 adjacent the pump manifold plate 37h, such areas being generally outlined by parallel dotted lines. These areas 53e are recessed, shallowly, as shown in FIG. 1, and being recessed, considerably reduce the total surface area of the face of the plate 53 in its rubbing contact with the pump manifold 37h, as related to the total area of the rubbing contact had by its other face with the manifold 51. In operation, because of the imbalance in frictional forces acting upon its faces, the port transfer plate 53 tends to remain motionless together with the manifold 51 until being urged to rotate in unison with the pump 37 and its manifold 37h by the engagement of the head of the bolt 43 in driving contact with the ear 53a. The practically instantaneous porting transfer is thus accomplished during a portion of the first revolution imparted to the power input shaft 23 in either direction of rotation.

To now describe the automatic fluid flow control function of the port transfer plate 53 more specifically, reference is first made to FIG. 6 which shows the port transfer plate 53 shifted to its proper operating position for counter-clockwise rotation of the power input shaft 23. As heretofore stated, pump manifold ports 52′ are fluid suction ports and pump manifold ports 52 are fluid discharge ports during counter-clockwise rotation. The fluid transfer porting holes 54 register with the manifold fluid suction ports 52′ causing the groove B to become part of the fluid suction circuit. The fluid transfer porting holes 55 register with the manifold fluid discharge ports 52, causing the groove C to become part of the fluid discharge circuit, the inactive porting holes 55′ being blocked by the surface of the manifold 37h.

During clockwise rotation of the power input shaft 23, the port transfer plate 53 will have shifted to its proper operating position as shown in FIG. 6A. The pump manifold ports 52 are suction ports and its ports 52′ are discharge ports, during clockwise rotation. The fluid transfer porting holes 54 now register with the manifold suction ports 52 causing the groove B to remain a part of the fluid suction circuit. In like manner, the fluid transfer porting holes 55′ now register with the manifold fluid discharge ports 52′, causing the groove C to remain a part of the fluid discharge circuit, the inactive porting holes 55 being blocked by the surface of the manifold 37h.

From the foregoing description, it is obvious that the grooves B and C retain their fluid suction and fluid discharge functions, respectively, regardless of the direction of rotation imparted to the power input shaft 23; consequently the capital letters B and C, together with numeral suffixes for differentiating between various sections of a circuit, will be used to designate suction and discharge passages. Additional capital letters will also be used later to designate other hydraulic circuits.

The porting details of the pump manifold 37h and the number and location of the fluid transfer porting holes 54, 55 and 55′ will vary with the type of positive displacement pump 37 employed, such design variations, in view of the foregoing description, being readily determined by those skilled in the art.

As shown in FIG. 1, a backing plate 56, having a radially extended flanged portion to conform to the outside diameter of the hub portion of the manifold 51, is slideably mounted on the torque tube 23d. A key 57 provides unitary rotation of the backing plate 56 with the torque tube 23d. A washer 58 is positioned axially on the torque tube 23d by a retaining snap ring 59. The collective thickness of a selected quantity of washer-shaped shims 60 establishes appropriate axial operative clearance for the manifold 51 and the port transfer plate 53. It will be understood that the backing plate 56 could be axially located by an adjustable collar having threaded engagement with the torque tube 23d, if desired, instead of employing the snap ring 59, the washer 58 and the shims 60 as illustrated.

To equalize hydraulic forces affecting the axial position of the manifold 51, a passage 51f is provided leading from a groove $C^1$ to a groove $51^g$ which has the proper area required to establish pressure-force equalization.

Referring to FIGS. 1, 2, 3, 11 and 17, the top surface of the web $20^c$ is machined to have proper fluid sealing contact with the flange $61^a$ of a valve housing 61. The flange $61^a$ is securely fastened to the web $20^c$ by means of bolts 63.

The generally tubularly shaped portion of the valve housing 61 is properly bored to receive a spool-type slideable control valve 62. The valve housing 61 has a relief area E located centrally of its length, and adjacent thereto are four raised ledges $61^b$ upon which is mounted a tubular, flanged control shaft support 64 secured thereto by bolts 65.

A control shaft 66 has a diametrically enlarged end portion $66^a$ located immediately below the control shaft support 64, which enlarged portion includes an off-center mounted valve bar actuating pin $66^b$. The control shaft 66 extends vertically through its support 64. A control lever 69 is tightly clamped to the control shaft 66 by means of the clamp bolt $69^a$.

Figure 11:
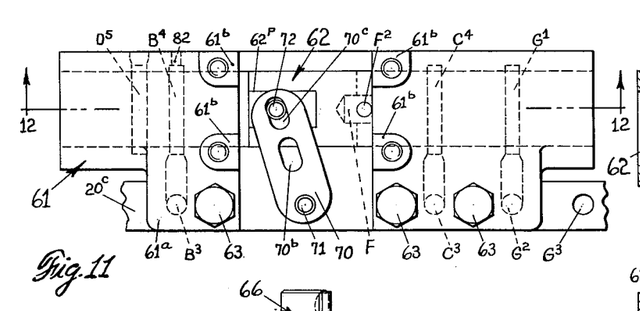
FIG. 11 is a top view of the valve housing as observed at line 11—11 of FIG. 3, with the valve operating shaft and its supporting member removed, showing the pivoted valve actuating bar as it would appear with the valve in neutral, with phantom lines outlining the location of all valve housing fluid passages and also showing a portion of the receptacle web member with its after-pressure port.

Referring more particularly to FIGS. 1 and 11, a valve actuating bar 70 is pivotably mounted to the valve housing flange $61^a$ by a pivot pin 71. The valve actuating bar 70 has an elongated slot $70^b$ near the center of its length, adapted to receive therein the valve bar actuating pin $66^b$. The valve actuating bar 70 has another elongated slot $70^c$ in the end opposite the pivoted end.

The slideable control valve 62 has a vertical hole formed through its midsection through which extends a cross-pin 72, a set screw $62^a$ retaining the cross-pin at its assembled position. The upper end of the cross-pin 72 is operatively engaged within the slot $70^c$ of the actuating bar 70, and its lower end extends into the slot $61^e$ within the bottom wall of the valve housing 61 and prevents rotation of the valve 62 relatively to its housing and limits its required longitudinal movement within the housing. It will now be understood that rotation of the control lever 69 will cause the off-set pin $66^b$ of the control shaft 66 to actuate the bar 70 for imparting sliding motion to the valve 62. The valve 62 has a flattened portion $62^p$ to accommodate the actuating bar 70.

As illustrated in FIGS. 2, 8, 9 and 16, the valve housing 61 has a flat vertical surface $61^f$ near one end and diametrically opposite its flange $61^a$. The flat surface $61^f$ is machined to provide for proper fluid sealing contact with a pump oil supply unit generally designated as a unit 73, and which is securely fastened to the valve housing surface $61^f$ by bolts 74 and 75.

As shown in FIG. 5, the combined pump oil supply unit designated 73 consists of a main vertically disposed tubular portion $73^a$ having a closed top, which tubular portion $73^a$ extends to close proximity with the bottom of the receptacle 20 and which shall hereafter be called the pump oil feed tube $73^a$. The lower portion of the pump oil feed tube $73^a$ joins with a horizontally disposed hollow extension $73^b$ having an oil entry port $D^1$. As viewed in FIGS. 2, 3 and 5, a free ball check valve 76 and its inlet port $73^c$ is located immediately above the junction of the horizontal extension $73^b$ had with the vertical pump oil feed tube $73^a$.

The pump oil supply unit 73 also includes a larger diameter vertically disposed tubular portion $73^d$ having an open top end and which shall hereafter be referred to as the pump priming tube $73^d$. A hollow, ball-shaped floating type check valve 77 is shown within the pump priming tube $73^d$, the uppermost position of the check valve 77 being established by the body of the bolt 75 passing through such tube. For operating purposes the pump priming tube $73^d$ will usually be completely filled with fluid, hence the float-check valve 77 is illustrated at its uppermost position. The lower end of the pump priming tube $73^d$ has a port $73^e$, slightly below which is located a vertically elongated cross-port $73^f$ which, due to elongation, cannot be closed by the ball check valve 76. A specific functional description of the combined pump oil supply unit 73 will be set forth later.

Referring to FIGS. 1 and 3, the non-rotatable manifold 51 is provided with fluid suction and discharge grooves $B^1$ and $C^1$, respectively, which coincide in radial location of and are approximately the shape and depth of the grooves B and C provided in the adjacent face of the port transfer plate 53. As illustrated in FIG. 3, the upper region of the manifold 51 is provided with a fluid suction passage $B^2$ and a fluid discharge passage $C^2$, partly shown in dotted lines. These fluid passages match up with similar passages formed within the web $20^c$, emerging at the top surface thereof.

Now referring to FIGS. 3, 6, $6^A$ and particularly FIG. 8, the fluid suction passage $B^2$ may be more fully described as having its source at the annular groove B in the port transfer plate 53 as seen in FIGS. 6 and $6^A$, and extends to the matching annular groove $B^1$ as seen in FIG. 3, whereas it becomes an elongated oval passage $B^2$ which extends from the face of the manifold flange $51^a$ and then upward through the web $20^c$, where it funnels to a round passage $B^3$ which extends through the valve housing flange $61^a$ into the passage $B^4$, which is a suction groove circling the interior of the valve housing 61 where the suction circuit B terminates.

As shown in FIGS. $6^a$ and 7, the fluid discharge passage $C^2$ has its source at the annular groove C in the port transfer plate 53, and extends to the matching annular groove $C^1$ within the face of the manifold flange $51^a$, whereas it becomes an elongated oval passage $C^2$ which extends away from the face of the manifold flange $51^a$ and then upwardly through the web $20^c$, whereat it funnels to a round passage $C^3$ which extends through the valve housing flange $61^a$ into a valve encircling discharge groove $C^4$, terminating thereat.

Figure 12:
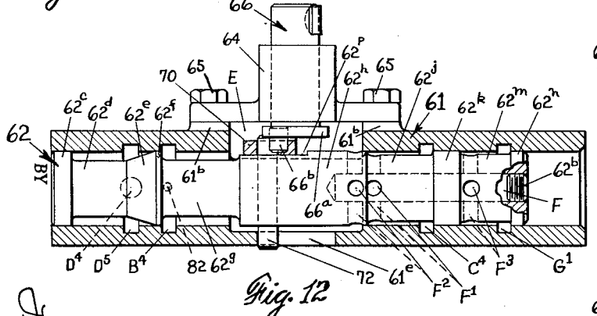
FIG. 12 is a typical vertical section of the valve housing and valve actuating bar with the valve positioned in neutral, taken on line 12—12 of FIG. 11, showing an elevation of the valve operating shaft and its supporting member, a portion of the valve being broken away to show the plugged end of the valve's intercommunication circuit, the balance of such circuit being represented by phantom lines.

Referring to FIGS. 5, 9 and 12, a valve housing suction-supplying-facility for oil and air is generally designated D and E, respectively. The oil circuit D may be considered as having its source either at the entry port $D^1$ located in the bottom of the bottom of the pump oil feed tube extension $73^b$ or within zone $D^2$ within the pump priming tube $73^d$. The $D^1$ entry port communicates with zone $D^3$ in the upper portion of the pump oil feed tube $73^a$ through the check valve inlet port $73^c$ when the ball check valve 76 is in open position. The zone $D^2$ communicates with the zone $D^3$ through the cross-port $73^f$.

Referring particularly to FIG. 9, the zone $D^3$ is shown communicating with the valve housing 61 through a port $D^4$ extending through the mounting wall of the pump oil supply unit 73, the oil circuit D terminating as a valve encompassing oil suction groove $D^5$ within the valve housing 61. Referring now to FIG. 12, the oil-free area beneath the mounting flange of the control shaft support 64 is the source for the air circuit E.

Figure 13:
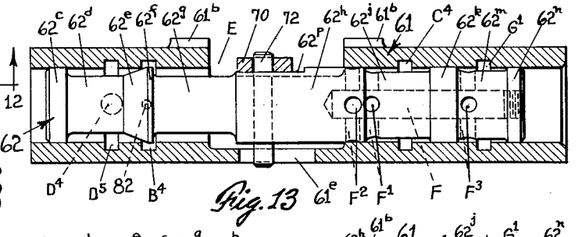
FIGS. 13, 14 and 15 show the valve and valve housing sections illustrated in FIG. 12, but with the valve in progressively advanced positions.
Figure 14:
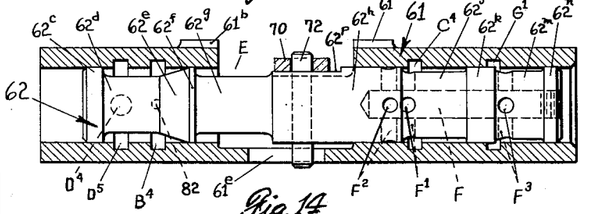
Figure 15:
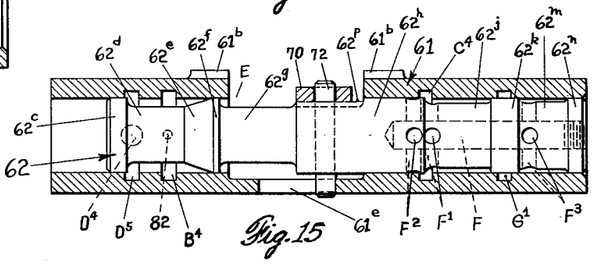

The spool-type valve 62 contains a centrally located longitudinally extending passage F which provides intercommunication for three groups of radially formed ports $F^1$, $F^2$, and $F^3$, illustrated in FIGS. 10 to 15 inclusive. The passage F is closed at the end of the valve 62 by use of a threaded plug $62^b$. Although more specific interrelated functions between the F circuit ports and other hydraulic passages will be covered later in discussing the operation of the device, general functions of the F circuit ports will now be described. Referring to FIG. 12, attention is called to the fluid discharge groove $C^4$, the terminus of the fluid discharge circuit C provided for the pump 37. It will be seen that portions $62^h$ and $62^k$ of the valve 62 have sealing contact with the bore of the valve housing 61, the portion $62^j$ being of reduced diameter including the region whereat the fluid entry ports $F^1$ are located. At the illustrated position of the valve 62, the fluid entry ports $F^1$ provide for fluid discharge from the groove $C^4$ into the intercommunicating passage F, thence to the fluid exit ports $F^2$ and the alternate fluid exit ports $F^3$. At the partially advanced positions of the valve 62 as shown in FIGS. 13 and 14, ports $F^2$ are in closed relation with the valve seat, fluid flow being through ports $F^1$, passage F and ports $F^3$. FIG. 15 shows the valve 62 at the end of its travel, the ports $F^1$ and $F^2$ both permitting flow of fluids from the groove $C^4$ into passage F, the ports $F^3$ providing passage into the area defined by the valve portions $62^k$, $62^m$ and $62^n$, the two portions $62^k$ and $62^n$ being in sealing contact with the valve seat.

Continued beneficial use of discharged fluids, after their volume and pressure has been controlled by the valve 62 in co-action with the valve seat so as to obtain the desired power transmitting or power absorbing performance of the apparatus, is provided by an after-pressure fluid discharge circuit G now to be described. The term "after-pressure" is used to emphasize the fact that the discharge pressure controlled by the valve 62, during such transmission or absorption of power by the apparatus, will have no pressure effect whatsoever on the circuits now to be described, as all torque-generated fluid pressure will be retained within the bore of the valve housing 61.

FIG. 10 shows a groove $G^1$ surrounding the valve 62, provided to receive fluids discharged from the ports $F^3$. The after-pressure fluid discharge circuit G extends through the flange $61^a$ of the valve housing 61 and merges with a passage $G^2$ within the web $20^c$. Referring to FIG. 3, the passage $G^2$ merges with an enlarged passage $G^3$ that communicates with a horizontal passage $G^4$ which is threaded to accommodate the pipe plug 79. Passage $G^3$ extends vertically through the web $20^c$ to communicate with a threaded horizontal passage shown closed at its outer end by the pipe plug 78. A still further extension of passage $G^3$ communicates with a horizontal passage $G^5$, closed at its outer end by the pipe plug 80, and extends upwardly into communication with a fluid distribution system.

Figure 17:
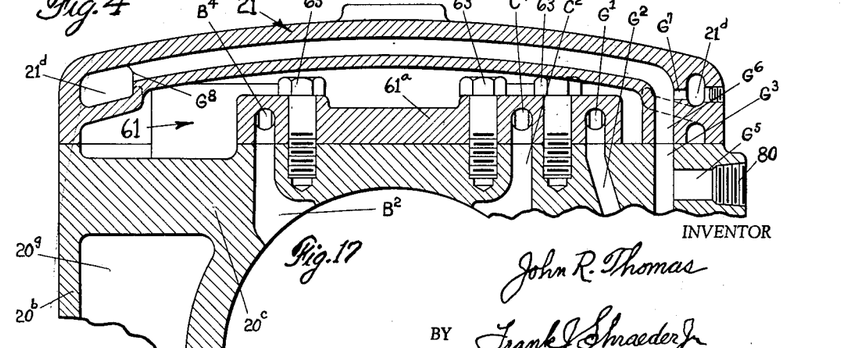
FIG. 17 is a fragmentary section, taken on line 17—17 of FIG. 2, showing the receptacle cover's fluid distribution porting communicating with the fluid distribution channel and the receptacle web member's after-pressure porting.
Figure 20:
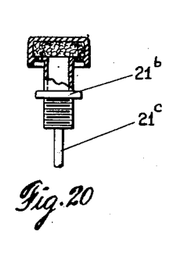
FIG. 20 is a fragmentary section illustrating the combined fill plug and oil level dip stick.

Now referring to FIGS. 2, 3 and 17 showing the fluid distribution system wherein the passage $G^3$ is shown merging with a similar passage $G^6$ formed within the receptacle cover 21, as more clearly shown in FIG. 17, it will be seen that the passage $G^6$ continues upwardly and axially transversely within the receptacle cover 21 terminating at a discharge opening $G^8$ disposed over the channel $21^d$. A small horizontal port $G^7$ disposed above channel $21^d$ extends through the annular wall encircling the vertical portion of the passage $G^6$ to afford flow of a portion of the fluid passing through the after-pressure circuit directly into the channel $21^d$.

It is to be noted in FIG. 16 that the channel $21^d$ is subjected to continuous flooding by the delivery of fluid to it by the G circuit and by other means herein described, and that channel $21^d$ extends directly over the pump priming tube $73^d$ and is provided with a drain port $21^f$ affording adequate flow of fluid into the pump priming tube $73^d$ during operation. It is also to be noted that the oil slinger 48 will continuously, when revolving, deposit oil upon the under-surface of the cover 21, which, because of its transversely crowned form will cause a substantial amount of oil to flow each way from the center region thereof into the channel $21^d$ to afford distribution of oil for priming function.

It is to be noted that oil over-flowing from the downwardly outwardly extending channel $21^d$ will flow downwardly by gravity as a fluid film adhering to the inner surfaces of the walls of receptacle 20 to thereby provide maximum dissipation of heat therefrom while simultaneously releasing a substantial portion of air therefrom, when air is a part of the fluid entering channel $21^d$, thus such fluid will be substantially in liquid form when it reaches the oil reservoir region of receptacle 20.

Heat exchangers may be readily adapted to the apparatus. In many uses the type or character of power transmission or absorption by the apparatus involves rejection of heat in excess of the capacity of direct heat rejection by the receptacle 20 and its cover 21. The presence and availability of fluid flow from the pump 37, through use of the after-pressure G circuit in the following described manner, usually eliminates any need for external pumps and pump motors or other pump driving means commonly required by oil-to-water or oil-to-air heat exchangers.

Referring to FIGS. 2, 3, 17 and 21, the oil plug 78 may be removed. A commonly known type of threaded, hollow socket set screw, not shown, may be installed within the threaded passage shown slightly extending beyond the intersection of the hole, provided for the plug 78, with the passage $G^3$. For full flow diversion to a heat exchanger, the hollow socket set screw may be positioned completely across the passage $G^3$ whereby all vertical flow from passage $G^3$ directly to the passage $G^6$ is blocked. For partial flow utilization, the hollow socket set screw is adjusted to the position partially blocking the passage $G^3$ as desired and locked thereat with a second set screw, or with a threaded lock collar commonly used to lock set screws, neither of which are shown. Plug 78 may then be replaced.

The pipe plug 79 may be replaced by a suitable fluid line fitting for a fluid conducting line $79^a$ leading from the passage $G^4$ to the bottom or inlet opening of a heat exchanger 92. An appropriate return line $80^a$ may be installed from the outlet opening of the heat exchanger 92 to the passage $G^5$, from which passage the plug 80 had been removed and replaced with a suitable fluid line fitting. It will now be seen that the complete, or partial flow of fluids passing through the pump 37 will travel from the ports $F^3$ (see FIG. 10) through the groove $G^1$, through passages $G^2$ and $G^4$, through the heat exchanger 92, returning to the oil reservoir through the passage $G^6$, thence through the port $G^7$ and the opening $G^8$ into the channel $21^d$ for continued cooling during its return to the lower, or oil reservoir region of the receptacle 20. The quantity of fluid required to fill the heat exchanger 92 and its fluid conducting lines $79^a$ and $80^a$ is added to the apparatus by removal of the fill plug $21^b$, the oil level being adjusted after a period of operation by use of the dip stick $21^c$.

To insure lubrication of rotating elements of the pump 37, of surfaces of the non-rotatable manifold 51 and other associated elements during extended periods of neutral operation, a shallow slot 81 is formed in the mounting face of the pump oil supply unit 73 as shown in FIGS. 5, 8, 9 and 16. The slot 81 permits oil from the port $D^4$, which is beneath the normal oil level designated Y within the zone $D^3$, to flow across to a port 82 communicating with the suction groove $B^4$ of the valve housing 61. During neutral operation the groove $B^4$ admits a relatively high velocity air stream from zone E into the B circuit. The oil from the port 82 enters the air stream to be carried to the pump 37 for appropriate mist lubrication of the pump gears $37^c$ and $37^e$, the roller bearings 39 and the pilot roller bearing 29. A portion of the oil in the suction air stream collects within the passages of the manifold 51, which are directly beneath the passages $B^3$ and $C^3$, because of reductions in velocity when passing through these enlarged elongated oval areas, from where the oil enters the grooves B, $B^1$, C and $C^1$, to lubricate the adjacent surfaces of the manifold 51 and the port transfer plate 53. Some of the oil will enter the port $51^f$ and groove $51^g$ to lubricate the adjacent faces of the manifold 51 and its backing plate 56. Some oil from the grooves $51^g$ and $C^1$ provides lubrication for the roller bearing $23^f$.

*Operation as a Power Transmitter*

Referring to FIG. 1, the power input shaft 23 shall be considered as appropriately operatively connected to an engine, motor or to a rotating shaft or member of a powered machine by any well known means. The direction of input rotation and whether same is fixed or periodically changing may, in view of the automatic port transfer facility, be completely disregarded. The power output shaft 30 shall also be considered as operatively connected to a machine or element thereof requiring variable torque or speed. The receptacle 20 may be suitably fastened at its operating location by use of the mounting feet 20$^f$, or, in the event that the apparatus is in-line mounted whereby the shafts 23 and 30 are connected to driving and driven members which provide adequate support for the receptacle 20, a torque bar 87 may be applied to the mounting feet 20$^f$ of the receptacle 20 to prevent its rotation.

An appropriate control means 93 such as a control cable or rod, or remote control means such as, for example, a pneumatic or electric type control shall be considered as connected to the control lever 69. The lever 69 is movable through an arc of about 90 degrees to obtain full travel of the control valve 62.

The lower portion of the receptacle 20 is filled with a suitable fluid such as oil to an operating level approximating the line designated X shown in FIGS. 1 to 4 inclusive. As shown in FIGS. 1, 2 and 16, a portion of the oil slinger 48 extending into the static body of oil, rotating with the power input shaft 23, causes a complete filling of the priming tube 73$^d$ through the channel 21$^d$. Assuming that the control valve 62 had been moved to its initially normal neutral position as shown in FIG. 12, the float-check valve 77 has moved to its uppermost position against the body of the bolt 75. The full zone D$^2$ provides a horizontally level oil column within the zone D$^3$, the height of such oil column being illustrated by the line Y in FIG. 5.

*Neutral Operation-Employing Air Only*

For neutral operation of the apparatus, the proper position of the control valve 62 is illustrated in FIG. 12. It will be noted that the valve portions 62$^c$, 62$^d$, 62$^e$ and 62$^f$ form a confined area for the oil within the port D$^4$ and the valve housing groove D$^5$, the portion 62$^f$ isolating same from the groove B$^4$ and the pump 37 except for the by-pass lubrication passage 81 and its port 82 (FIGS. 5, 8 and 9) the functions of which have been heretofore described. The suction of the pump 37 is supplied with air from region E which passes by the reduced diameter portion 62$^g$ and through the suction groove B$^4$, thence through the B circuit, entering the pump manifold suction ports 52 (or 52' whichever is applicable to the direction of rotation) through the port transfer plate ports 54. The discharge of the pump 37 is through the applicable port transfer plate ports 55 or 55', thence through the C circuit, whereupon the air enters the valve ports F$^1$, freely escaping through the valve passage F and ports F$^2$ into the general area E.

*Low Torque, Slow Speed, Employing Air and Oil*

During the advance of the valve 62 toward the position illustrated in FIG. 13 by manipulation of the control lever 69, the valve portion 62$^f$ is the divider between the oil and air sources at all valve positions.

After the valve portion 62$^f$ passes the left edge of the groove B$^4$, oil from the zone D$^3$ of the pump oil feed tube 73$^a$ flows through the port D$^4$ past the sloped portion 62$^e$, the end portion 62$^c$ preventing any fluid escape through that end of the bore of the valve housing 61 at all positions of the valve 62. Such oil used from the zone D$^3$ is simultaneously replaced by oil from the zone D$^2$ flowing into the zone D$^3$ through the cross-port 73$^f$, unless and until the demand for oil being admitted by the valve 62 into the pump 37 exceeds the replacement rate existing for the zone D$^2$ area, at which time the fluid level in zone D$^2$ lowers until the float-check valve 77 closes the port 73$^e$, when the pump 37 will have been adequately primed, enabling it to draw its oil through the oil entry port D$^1$ and through the ball check valve port 73$^c$. The float-check valve 77 has minimal buoyancy, consequently will continue to retain the port 73$^e$ closed by the force of the suction of the pump 37 in overcoming the lifting of oil from the bottom of the receptacle 20, although the zone D$^2$ rapidly refills.

It will be noted that the angle and length of the sloped valve portion 62$^e$ governs the rate of oil admittance into the groove B$^4$ relative the valve travel toward engagement, the modification of the configuration of such valve portion 62$^e$ affording a simple and effective means to obtain practically any torque-speed versus valve-travel characteristic which may be desired.

At the valve position shown in FIG. 13, some air is also entering the suction groove B$^4$ from the zone E. The combined flow of air and oil to, and from, the pump 37 will follow the same routing as for the neutral operation, FIG. 12, except that the fluid exit ports F$^2$ are now closed by the valve seat. Fluid discharge from the groove C$^4$ enters ports F$^1$, travels through the passage F and out through the alternate fluid exit ports F$^3$, thence into the G circuit.

Particular attention is directed to the valve portion 62$^j$, regarding its diametral relation to the bore of the valve housing 61. One pre-requisite to optimum performance of hydrostatic power transmitting apparatus utilizing varied mixtures of air and oil as a circulating medium during operation in their lower power ranges is that of providing an approximately constant annular space for the discharge circuit C during the gradual transition from solely air to solely oil for the suction circuit. A constant discharge area or preferred variations therefrom can be readily obtained for the valve control system of the present invention by modifying the shape of the valve portion 62$^j$ as to, for example, its actual diametral relation to the bore of the valve housing 61 by sizing, including, for some requirements, the application of appropriate uniform or compound tapers longitudinally of the portion 62$^j$.

*Medium Torque, Medium Speed, Oil Only, Discharge Partially Closed*

A comparative study of FIGS. 13 and 14 will disclose only two major changes in the fluid suction and discharge control conditions as the valve 62 moves from the position illustrated in FIG. 13 to finally reach the position shown in FIG. 14. First, the valve portion 62$^f$ has moved considerably beyond the point where it began to prevent air from entering the fluid suction groove B$^4$. It will continue to block air from the suction circuit during still further advanced positions of the valve 62, up to and including the valve's fully engaged position. Secondly, the valve portion 62$^k$ which, in the two previously described positions FIGS. 12 and 13, had no direct effect on hydraulic circuits, is now seen to partially cover the after-pressure groove G$^1$.

It should be noted that effective valved pressure is functionally accomplished by the leading edge of the valve portion 62$^k$ approaching the outer or right hand edge of the groove G$^1$. Consequently no discharge pressure exists within the groove G$^1$ or within the balance of the G circuit except that which is required to provide for the flow of fluids through the G circuit. It should also be noted that pressure-wise, the valve housing fluid discharge groove C$^4$ functions only responsively to the surface of the valve portion 62$^j$ to produce constant pressure within the entire C circuit, including the pressure areas within the pump 37, in the manner heretofore described, and is never directly closed by the valve 62. It should be further noted that a slight chamfer can be employed for approximately one-sixth of the total length of the valve portion 62$^k$, at the right end thereof, to modify and extend discharge pressure-rise versus valve travel.

*Full Engagement, Make-up Oil Only, Discharge Closed*

Continued movement of the valve 62 from the position shown in FIG. 14 toward that illustrated in FIG. 15 effects control in the high torque and high speed range, reaching the potentially highest torque and speed levels when the valve 62 is positioned as shown in FIG. 15. Note that the oil suction groove D$^5$ remains partly open to provide for admittance of oil as required by the pump 37. For all practical purposes, the pump 37 can be considered as being completely stalled, whereupon the sun gear 37$^c$ and the power output shaft 30 operate almost in unison with the power input shaft 23, however the slight inherent slippage of the pump 37 will require some make-up oil. Suction forces in the suction circuit B being of low magnitude, the weight of the ball check valve 76 (see FIG. 5), will cause it to close the port 73$^c$ and the buoyancy of the float-check valve 77 will provide for its return to the position shown in FIGS. 2 and 5, whereupon the required make-up oil is obtained from the zone D$^2$ of the priming tube 73$^d$.

Discharged fluid within the groove C$^4$ is contained within both of the valve ports F$^1$ and F$^2$, within the passage F, the valve ports F$^3$, the region encircling the valve portion 62$^m$, and is confined in these regions by the sealing association of the valve portions 62$^k$ and 62$^n$ had with the bore of the valve housing 61.

General Operative Character

It will now be understood from the foregoing descriptions directed to the operations obtained with the control valve positions shown in FIGS. 12 to 15 inclusive, that a definite interrelation exists between the pressure, volume and velocity of the valve controlled fluids and the torque and speed transmitted by the output shaft 30. As shown in FIG. 12, neutral operation entails the least oil volume since compressible air is in use; fluid velocity is at the maximum since the output speed of the shaft 30 is zero and the speed of the planet gears 37$^e$ is at the maximum; and fluid pressure is at the minimum, minimum output torque for the shaft 30 prevailing. Progressively considering FIGS. 13, 14 and 15 and the related performance descriptions thereof, the volume of active oil increases as the suction circuit B is changed from compressible air to practically incompressible oil; fluid pressure rises proportionally to the torque being transmitted by the shaft 30; and fluid velocity decreases proportionally to the increase in output speed of the shaft 30, becoming approximately nil when the apparatus is fully engaged. Precise control of the torque and speed being transmitted by the apparatus is responsive to, and dependent upon, the hydraulic circuit control by the valve 62.

Operation as a Power Absorber

Since control-wise operation of the present invention as a power absorber in dynamometer equipment or as adapted to industrial or other machines requiring precisely controllable, continuous or intermittent retardation facilities, and wherewith heat exchangers may be required, is fundamentally the same as heretofore described for its operation as a power transmitter, the essential adaptational and operational differences may now be set forth as follows:

To illustrate one use in the field of power absorption wherein accurate full-scale measurement is desired of power which is being developed or transmitted by engines, motors or other mechanisms which are to be power tested, and referring to FIG. 21, the present invention is shown adapted as a dynamometer absorption unit 20, oscillatably installed therein by use of an anti-friction bearing 84 mounted on a tubular extension 25$^a$ of the adapting cartridge 25 and by use of an anti-friction bearing 85 mounted on the power output extension shaft 30$^b$. A power linking member 86 is securely fastened to the output shaft flanged portion 30$^a$ as with bolts 30$^c$ and coupled to the receptacle end wall 20$^k$ (FIGS. 1 and 2) by a bolt 86$^a$ so as to transmit a slight movement and torque from the power output shaft 30 to the receptacle 20.

A torque bar 87 is securely fastened to a pair of the mounting feet 20$^f$ (see FIGS. 1, 2 or 3) by bolts not shown. A counter-balance bar 88 may be fastened to a pair of the mounting feet 20$^f$ if desired, having a counter-weight 88$^a$ moveably mounted thereon. The torque bar 87 is of a length and form appropriate for use with a weighing scale such as, for example, the platform type scale 89 having selective loading counter-weights 89$^a$ and an adjustable balance-weight 89$^b$.

The numeral 90 is used to designate a prime-mover to be dynamometer-tested, or any power transmitting machine or apparatus to be dynamometer-tested and which is prime-mover-driven, the output shaft 90$^a$ of which is coupled to the power input shaft 23 by means of a suitable coupling 91.

A heat exchanger 92, which is usually required with most all types of dynamometer absorption devices, is shown connected to the absorption unit 20, by means of a flexible fluid line 79$^a$ leading from the G$^4$ passage normally closed by the plug 79 to the inlet of the heat exchanger 92, also by a flexible fluid line 80$^a$ leading from the outlet of the heat exchanger 92 to the G$^5$ passage normally closed by the plug 80.

Suitable control means 93 may be applied to lever 69, when the present apparatus is to be operated as a power absorption unit, as heretofore described for power transmitting operations. The functional operation of the present apparatus is the same for power absorption as has been described for power transmitting operations illustrated in FIGS. 12 to 14 inclusive.

A suitably mounted adjustable stop (not shown) for the control lever 69, or its control means 93, may be adjusted to provide the desired maximum torque to be absorbed by the unit 20, such stop will establish the appropriate maximum advanced position for the control lever 69, permitting the pump 37 to provide fluid delivery to and from heat exchangers in all adaptations thereof requiring uninterrupted fluid flow therethrough in order to obtain the desired fluid cooling capacity.

It will be understood by those skilled in the art to which my invention relates that the details of construction of the various parts and their arrangements, shown in the drawings for illustrative purposes, may be modified and rearranged within the scope of the appended claims without departing from the spirit of the invention.

I claim:

1. Variable power transmitting hydraulic apparatus comprising a non-rotatable receptacle having a compartment containing a static body of oil and a column of priming oil positioned remotely vertically from the static body of oil; an oil supply unit associated with the static body of oil and with the column of priming oil and communicating with a fluid-circulating mechanical power-transmitting pump operatively connected with a power-driven input shaft extending into said receptacle and adapted to variably transmit power to an output shaft extending exteriorly from said receptacle and including pump priming means and oil feed means; said priming means and said oil feed means being alternately automatically operable responsively to the demand of the pump for oil, said oil supply unit including gravity-actuated valve-controlled oil feed means communicating with said static body of oil and operatively associated with buoyant-valve-controlled priming means communicating with said column of priming oil positioned remotely vertically from said static body of oil.

2. In variable power transmitting hydraulic apparatus comprising a non-rotatable receptacle having a compartment containing a static body of oil and a fluid-circulating mechanical power-transmitting pump having fluid intake and discharge passages: valve means for controlling the flow of air or of concurrent mixtures of relatively varied proportions of air and oil or of only oil through said passages, an oil supply unit for said pump comprising a pump priming tube and a pump feed tube, said pump priming tube being positioned remotely vertically from said static body of oil and having fluid passages leading to said pump, and said pump feed tube communicating with said static body of oil, means for supplying the pump priming tube with oil from the pump discharge passages, and supplemental means adapted to transfer oil from said static body of oil to the uppermost regions of said receptacle for flow therefrom by gravity into the priming tube continuously during rotation of the pump by power-driven means.

3. In variable power transmitting hydraulic apparatus as set forth in claim 2 wherein said supplemental means comprises a flat circular slinger plate mounted on said fluid-circulating mechanical power-transmitting pump and rotatable therewith, the periphery of said circular slinger plate being continuously partially immersed in said static body of oil and adapted to carry a portion of said static body of oil to said uppermost regions of said receptacle continuously during rotations of said pump for momentary deposit of oil thereon, thereafter the oil to flow by gravity into a channel provided within said non-rotatable receptacle adjacent said uppermost regions so as to constitute a conduit for said oil for flow to the vicinity directly above said pump priming tube whereby a portion of the oil flows by gravity from said channel conduit through a drain port provided therein and into said priming tube.

4. Variable power transmitting hydraulic apparatus operable as a power absorption mechanism whereby the absorbed power is transmitted to an associated member by means of a substantially stationary receptacle comprising: a rotatable fluid-circulating mechanical power-transmitting pump, a receptacle and a static body of oil reposing in the lower regions of said receptacle, a priming column of oil positioned remotely vertically from said static body of oil, an oil supply unit including a pump feed tube and a pump priming tube connecting said static body of oil and said priming column of oil with said pump, fluid flow control valve means within said receptacle communicating with said oil supply unit and with asid pump for controlling the flow of air or of concurrent mixtures of relatively varied portions of air and oil or of only oil through said pump and responsive to actuating control means disposed exteriorly of said receptacle to thereby selectively vary the magnitude of absorbed power being transmitted to said associated member by said receptacle.

5. Variable power transmitting hydraulic apparatus operable as a power absorption mechanism as set forth in claim 4 wherein said rotatable fluid-circulating mechanical power-transmitting pump and said fluid flow control valve means within said receptacle has included therewith an automatically actuable circuit porting control element interposed between a rotatable manifold plate of said pump and a non-rotatable manifold supported by said receptacle, said automatically actuable circuit porting control element having limited rotational movement relative to said rotatable manifold plate to thereby effect alternate passages for said flow of air or of concurrent mixtures of relatively varied proportions of air and oil or of only oil in accordance with the directional rotation of said pump permitting said fluid flow control valve means within said receptacle to retain its normal functional character regardless of the direction of rotation of said pump.

6. Variable power transmitting hydraulic apparatus interposed between a prime-mover or a prime-mover-driven means and power-actuated apparatus and comprising a non-rotatable receptacle containing a static body of oil, a rotatable fluid-circulating mechanical power-transmitting pumping means, a power-driven input shaft extending into said non-rotatable receptacle and operatively connected to said pumping means, an output shaft for said pumping means extending exteriorly of said receptacle, a fluid supply unit and a fluid flow control instrumentality within the receptacle for said pumping means, said fluid flow control instrumentality being non-rotatably supported remotely from said rotatable pumping means and functionally associated with fluid passages within the receptacle structure and comprising a stationary removable valve seat carrying a slideable spool-type valve for controlling volume and pressure of air, or concurrent mixtures of air and oil or of only oil flowing through said pumping means to thereby selectively variably control the power being transmitted by said output shaft to said power actuated apparatus, said fluid passages within the receptacle structure being arranged for effecting distribution of pump-discharged fluid over the inner surfaces of the walls of said non-rotatable receptacle to transfer heat by convection from the pump-discharged fluid to said receptacle; said fluid passages including exteriorly accessible means whereby the pump-discharged fluid may optionally be caused to completely or partially flow through heat convection apparatus supplemental to said non-rotatable receptacle and be caused to return thereafter to said receptacle for further transfer of heat by convection occuring between the fluid and the receptacle in the event of the existence of a temperature differential between same, said partial or complete flow of fluid being provided by said fluid-circulating power-transmitting pumping means during its transmission of power from said prime-mover or prime-mover-driven means to said power actuated apparatus.

7. Variable power transmitting hydraulic apparatus operatively employing two fluids of different resistant value and comprising: a non-rotatable receptacle containing a static body of oil, a rotatable fluid-circulating mechanical power-transmitting pump within said receptacle, a power-driven input shaft extending into said receptacle operatively connected with said pump, an output shaft operatively connected with said pump, a fluid flow control valve within said receptacle, fluid suction and discharge passages operatively associated with said pump and with said fluid flow control valve, a pump oil supply unit within said receptacle between said static body of oil and said pump for feeding the oil from said body of oil to said pump, said valve being mounted within said receptacle between said oil supply unit and said pump for controlling the flow of air or of mixtures of concurrent relatively varied proportions of air and oil or of only oil through said passages and through said pump to thereby control the stationary position or relatively variable rotations of said output shaft during the rotation of said input shaft whereby selectively variable torque and speed are imparted to said output shaft, said pump oil supply unit including pump oil priming means whereby quantities of oil are provided to initially satisfy the fluid suction demand of said fluid-circulating mechanical power-transmitting pump as selectively directed by said fluid flow control valve, and oil feeding means automatically operable after the operation of the priming means has energized the pump and its demand for oil as selectively established by said fluid flow control valve necessitates quantities of oil available only from the oil feeding means communicating with the static body of oil contained by said non-rotatable receptacle.

8. Variable power transmitting hydraulic apparatus operatively employing two fluids of different resistant value and comprising: a non-rotatable receptacle containing a static body of oil, a rotatable fluid-circulating mechanical power-transmitting pump within said receptacle, a power-driven input shaft extending into said receptacle operatively connected with said pump, an output shaft operatively connected with said pump, a fluid flow control valve within said receptacle, fluid suction and discharge passages operatively associated with said pump and with said fluid flow control valve, a pump oil supply unit within said receptacle between said static body of oil and said pump for feeding the oil from said body of oil to said pump, said valve being mounted within said receptacle between said oil supply unit and said pump for controlling the flow of air or of mixtures of concurrent relatively varied proportions of air and oil or of only oil through said passages and through said pump to thereby control the stationary position or relatively variable rotations of said output shaft during the rotation of said input shaft whereby selectively variable torque and speed are imparted to said output shaft, said pump oil supply unit consisting of pump oil priming means associated with a column of oil positioned separately above said static body of oil, alternately operable with oil feeding means having a fluid passage connected with said static body of oil and responsive to changed rates of demand for oil by said fluid-circulating mechanical power-transmitting pump.

9. Variable power transmitting hydraulic apparatus operatively employing two fluids of different resistant value and comprising: a non-rotatable receptacle containing a static body of oil, a rotatable fluid-circulating mechanical power-transmitting pump within said receptacle, a power-driven input shaft extending into said receptacle operatively connected with said pump, an output shaft operatively connected with said pump, a fluid flow control valve within said receptacle, fluid suction and discharge passages operatively associated with said pump and with said fluid flow control valve, a pump oil supply unit within said receptacle between said static body of oil and said pump for feeding the oil from said body of oil to said pump, said valve being mounted within said receptacle between said oil supply unit and said pump for controlling the flow of air or of mixtures of concurrent relatively varied proportions of air and oil or of only oil through said passages and through said pump to thereby control the stationary position or relatively variable rotations of said output shaft during the rotation of said input shaft whereby selectively variable torque and speed are imparted to said output shaft, of a manifold plate rotatable with said pump and containing suction and discharge ports respectively for said suction and discharge passages, means comprising an automatically actuable circuit porting control element interposed between the rotatable manifold plate and a non-rotatable manifold supported by said non-rotatable receptacle and provided with limited rotational movement relative to said rotatable manifold plate to thereby effect alternate passages for said flow of air or of concurrent mixtures of relatively varied proportions of air and oil or of only oil in accordance with the directional rotation of said power-driven input shaft permitting said fluid flow control valve to retain its normal functional character regardless of the direction of rotation of said input shaft.

References Cited in the file of this patent
UNITED STATES PATENTS

| | | |
|---|---|---|
| 1,449,443 | Potter et al. | Mar. 27, 1923 |
| 1,554,081 | Garrett | Sept. 15, 1925 |
| 1,642,095 | Tracy | Sept. 13, 1927 |
| 1,743,409 | Tracy | Jan. 14, 1930 |
| 1,935,400 | Junkers | Nov. 14, 1933 |
| 1,956,893 | Carter | May 1, 1934 |
| 2,145,894 | Rusch | Feb. 7, 1939 |
| 2,724,266 | Baker et al. | Nov. 22, 1955 |
| 2,969,860 | Raun | Jan. 31, 1961 |

FOREIGN PATENTS

| | | |
|---|---|---|
| 812,657 | France | Feb. 8, 1937 |